H. H. MEYER.
GRAIN SEPARATOR.
APPLICATION FILED JULY 14, 1919.
1,353,059.
Patented Sept. 14, 1920.
3 SHEETS—SHEET 1.
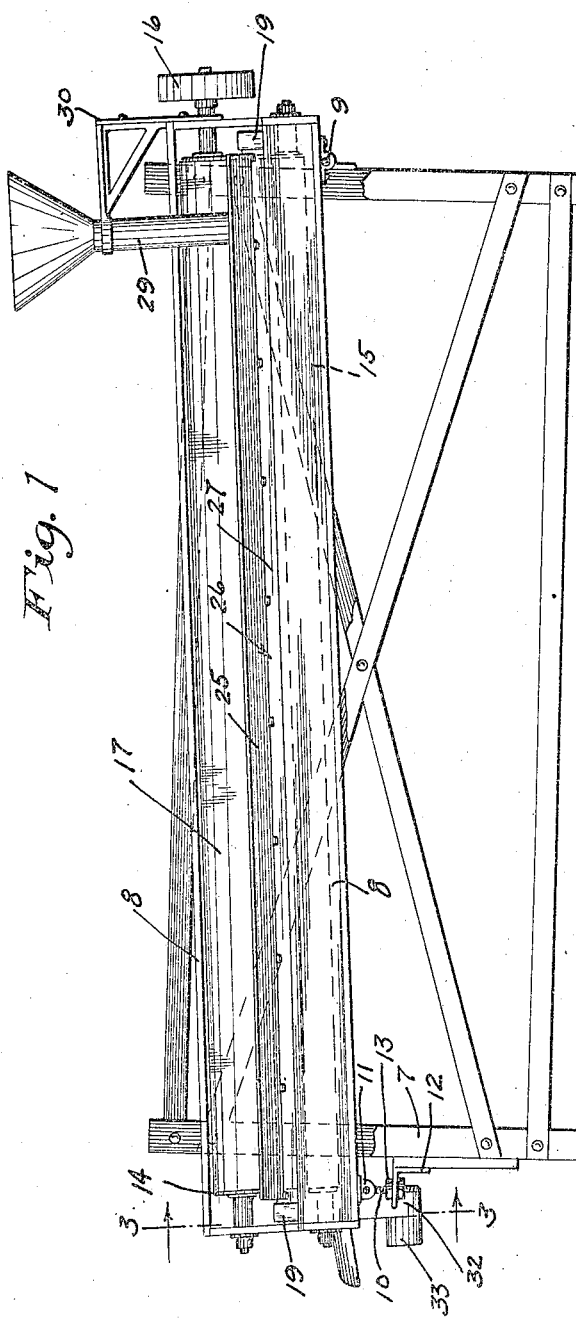
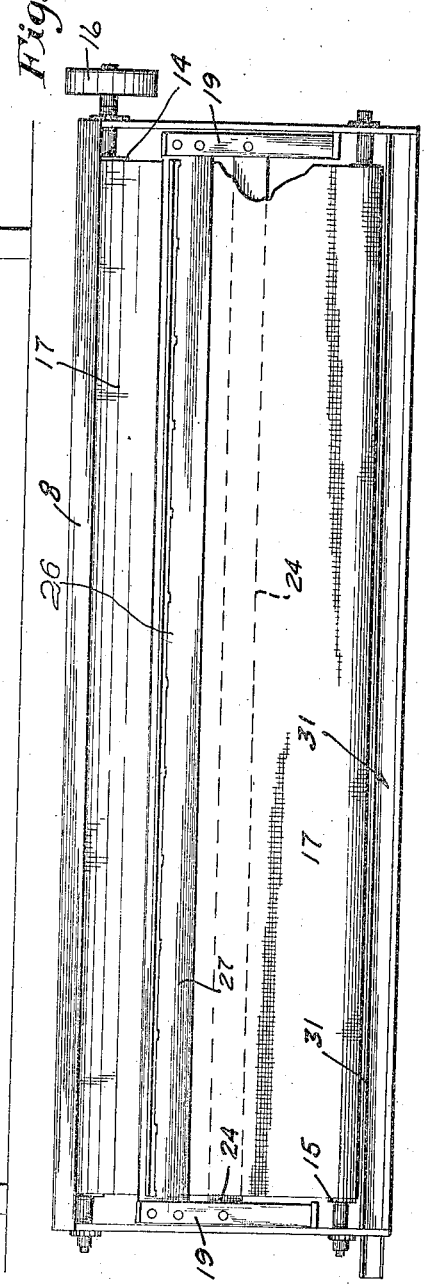
Inventor
Henry H. Meyer
By his Attorneys H. H. MEYER.
GRAIN SEPARATOR.
APPLICATION FILED JULY 14, 1919.
1,353,059.
Patented Sept. 14, 1920.
3 SHEETS—SHEET 3.
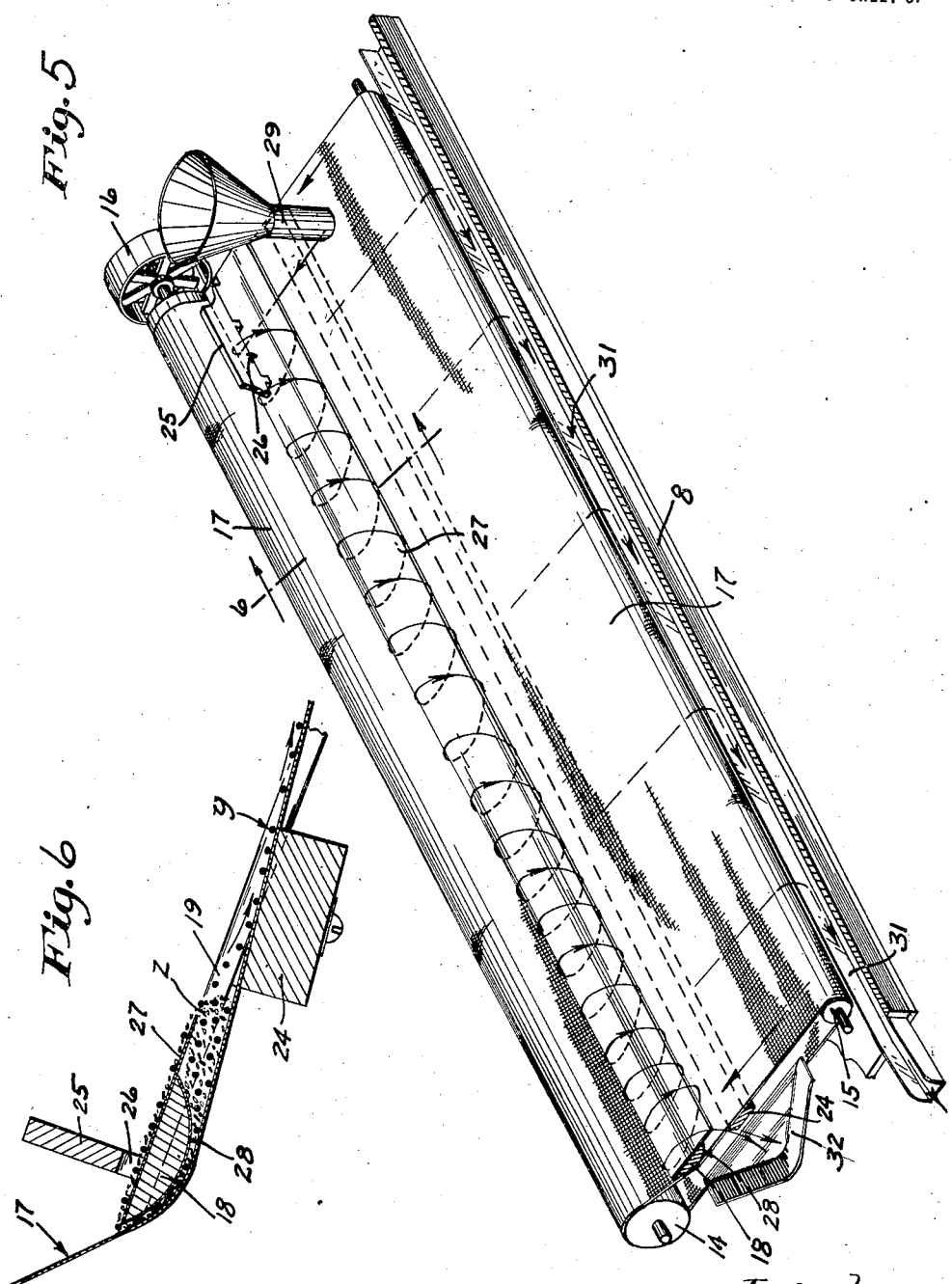
Inventor
Henry H. Meyer
By his Attorneys

UNITED STATES PATENT OFFICE.

HENRY H. MEYER, OF RED WING, MINNESOTA.

GRAIN-SEPARATOR.

1,353,059.   Specification of Letters Patent.   Patented Sept. 14, 1920.

Application filed July 14, 1919. Serial No. 310,771.

*To all whom it may concern:*

Be it known that I, HENRY H. MEYER, a citizen of the United States, residing at Red Wing, in the county of Goodhue and State of Minnesota, have invented certain new and useful Improvements in Grain-Separators; and I do hereby declare the following to be a full, clear, and exact description of the invention, such as will enable others skilled in the art to which it appertains to make and use the same.

My invention has for its object to provide an extremely simple and highly efficient grain separator intended for general use but especially adapted to separate wild pea seeds from wheat; and to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a front elevation of the improved grain separator;

Fig. 2 is a plan view of the same;

Fig. 5 is a perspective view of the separating apron and coöperating separating board the ends of which are sectioned to remove the supporting arms; and Fig. 6 is a detail view in section taken on the line 6—6 of Fig. 5 on an enlarged scale.

Figure 3:
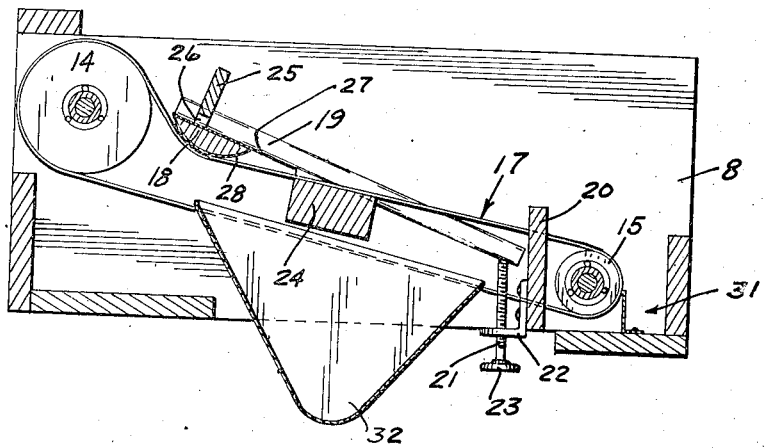
Fig. 3 is a transverse vertical section taken on the line 3—3 of Fig. 1 on an enlarged scale.
Figure 4:
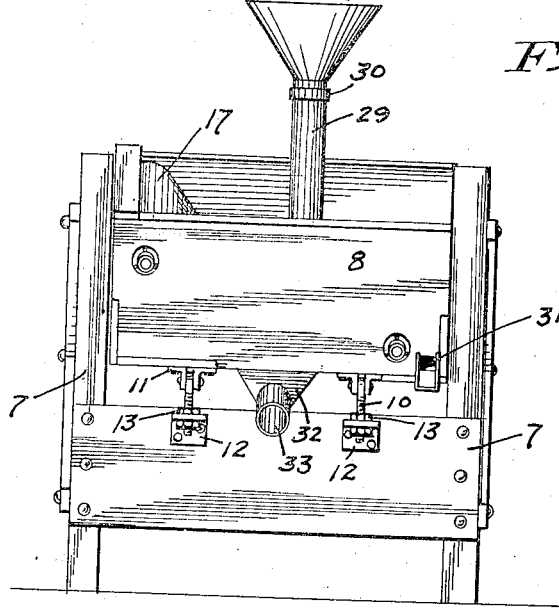
Fig. 4 is a lower end elevation of the same.

The numeral 7 indicates a rectangular main frame, having mounted therein a correspondingly formed longitudinally inclined supplemental frame 8, the length of which is somewhat greater than that of said main frame so that the ends thereof project outward of the ends of the main frame. The upper end of the supplemental frame 8 is pivotally supported on a horizontal rod 9 carried by the main frame 7, and its lower end is also supported from said main frame by a pair of eye bolts 10. The heads of the eye bolts 10 are pivoted to and between lugs 11 on the bottom of the supplemental frame 8 and their lower screw-threaded ends extend through apertures in the horizontal flanges of L-shaped brackets 12 secured to said supplemental frame. Nuts 13 are applied to the eye bolts 10 and engage the upper and lower faces of the brackets 12 to rigidly but adjustably connect said eye bolts thereto.

Journaled in the ends of the supplemental frame 8 are parallel driven and idle rollers 14 and 15, respectively, the former of which is at the back of said supplemental frame and the latter of which is at the front thereof. It will be noted that the diameter of the driven roller 14 is considerably larger than that of the idle roller 15 and has on its upper end a pulley 16 over which runs a driving belt not shown. It will also be noted that the axis of the driven roller 14 is located in a plane considerably above the axis of the idle roller 15 and both of said rollers are longitudinally inclined in the same direction as the supplemental frame 8. Obviously, by adjusting the nuts 13, the eye bolts 10 may be raised or lowered to change the inclination of the rollers 14 and 15.

An endless separating apron 17 is arranged to run over the rollers 14 and 15, and said roller 14 is driven in a direction to cause the upper or separating surface of said apron to travel upward from the roller 15, as indicated by the arrow marked on Fig. 5. A floating grain separating board 18 loosely rests upon the upper or separating surface of the apron 17 between the rollers 14 and 15, extends parallel thereto and is of a length somewhat greater than the transverse width of the apron 17, so that its ends project beyond the longitudinal edges of said apron. To the projecting ends of the separating board 18 is secured, by any suitable means a pair of forwardly projecting arms 19 located outward of the longitudinal edges of the apron 17 and their free ends loosely engage abutments 20 on the supplemental frame 8 and hold the separating board 18 quite close to the driven roller 14, as best shown in Fig. 3. The free or front ends of the arms 19 are pivotally and loosely supported for vertical swinging movement on the upper ends of a pair of adjusting screws 21 that have screw-threaded engagement with brackets 22 secured to the abutments 20. On the lower ends of the screws 21 are hand wheels 23 by which said screws may be turned to vertically adjust the ends of the arms 19 supported thereon. The abutment 20 will limit the endwise movement of the arms 19 toward the front of the machine, but under the travel of the upper run of the apron 17, said arms will tend to drift slightly from said abutment, owing to the friction produced on the separating board 18 by the apron 17.

The weight of the grain separating board 18 on the apron 17 causes said apron to sag so that the inclination of the separating surface thereof as it approaches the separating board 18 is inclined upwardly and after it leaves said board and passes upward over the driven roller 14, it is relatively steep. The separating surface of the apron 17, before passing under the separating board 18, travels over a deck 24 carried by the arms 19.

To prevent the grain separating board 18 from longitudinally bending or sagging and thereby produce a pocket in the separating surface of the apron 17, there is secured to the top of said separating board a stiffening rib 25, having in its lower end a multiplicity of relatively long arches 26 through which the grain may pass in its travel downward over the separating board 18. By reference to Fig. 6, it will be noted that the under surface of the separating board 18, which rests upon the separating surface of the apron 17, is segmental in cross section and that the top of said board is flat and has a transverse inclination that is slightly greater than that portion of the separating surface of the apron 17 approaching the separating board 18. It will also be noted that the top of the separating board 18 has a forwardly projecting extension 27 which materially increases the transverse width of the top of the separating board proper. The front edge of the extension 27 terminates quite close to the upper rear edge of the underlying deck 24. Preferably, the separating board 18 is entirely covered by sheet metal 28 and which metal, as shown, forms the top extension 27.

For the sake of convenience, the improved grain separator will be described as separating wild pea seeds Y from grain Z. The material to be separated is conveyed or otherwise delivered into an upright funnel-like spout 29 held by a bracket 30 secured to the supplemental frame 8. The lower end of the spout 29 is arranged to deliver the materials to be separated onto the separating surface of the apron 17 at the upper end thereof and just below or foward of the grain separating board 18. The upwardly moving separating surface of the apron 17 will carry the materials to be separated under the extension 27 and between the separating board 18 and said apron. After said materials have passed from between the apron 17 and separating board 18, they will roll downward over the top of said board and its extension 27 and again onto the upwardly moving surface of the apron 17. This process is repeated over and over again and the transverse inclination of the apron 17 will cause said materials to travel in a spiral course around the separating board from the upper end of said separating apron to the lower end thereof, as indicated in Fig. 5. As the materials pass over the separating board 18 and its extension 27, the wild pea seeds Y will be released from the wheat and as the pea seeds are more nearly round than the wheat, they will roll faster than the wheat, and in leaving the extension 27 will pass completely over the mass of material being separated and onto the separating surface of the apron 17 at a point directly over the table 24 and from thence they will roll downward over the upwardly moving surface of said apron and into an inclined trough 31. The wild pea seeds in the trough 31 will roll to the lower end of said trough and be caught in a sack or other receptacle. By reference to Fig. 3, it will be noted that the front or outer wall of the trough 31 extends above the roller 15 so that the wild pea seeds, when leaving the separating apron 17, will not pass completely over said trough, but will be deflected thereby into said trough. The cleaned wheat, after passing beyond the lower edge of the separating apron 17, will be precipitated into a trough 32 having a discharge spout 33 through which the cleaned grain may be conveyed to sacks or other receptacles provided therefor. In the separation of wild pea seeds from the wheat, it has been found, in actual usage, that an apron of canvas, the exposed surface of which is made smooth by graphite and soap, produces a very efficient separation.

What I claim is:—

1. In a grain separator, the combination with an apron having an upwardly moving separating surface, and a coöperating separating board extending transversely over said separating surface and arranged to permit the materials to be separated to be carried thereunder and operative to return said materials over the top thereof and back onto said separating surface.

2. In a grain separator, the combination with an apron having an upwardly moving transversely inclined separating surface, and a coöperating separating board extending transversely over said separating surface and arranged to permit the materials to be separated to be carried thereunder and operative to return said materials over the top thereof and back onto said separating surface.

3. In a grain separator, the combination with an apron having an upwardly moving transversely inclined separating surface, and a coöperating floating separating board extending transversely over and resting on said separating surface, said separating board being arranged to permit the materials to be separated to be carried thereunder and operative to return said materials over the top thereof and back on to said separating surface.

4. In a grain separator, the combination with an apron having an upwardly moving transversely inclined separating surface, a coöperating floating separating board extending transversely over and resting on said separating surface, said separating board being arranged to permit the materials to be separated to be carried thereunder and operative to return said materials over the top thereof and back on to said separating surface, and means for changing the transverse inclination of said separating surface.

5. In a grain separator, the combination with an apron having an upwardly moving transversely inclined separating surface, a coöperating floating separating board extending transversely over and resting on said separating surface, said separating board being arranged to permit the materials to be separated to be carried thereunder and operative to return said materials over the top thereof and back on to said separating surface, and means for changing the inclination of the upper face of said separating board in respect to the direction of travel of said apron.

6. In a grain separator, the combination with an apron having an upwardly moving transversely inclined separating surface, and a coöperating floating separating board extending tranversely over and resting on said separating surface, said separating board being arranged to permit the materials to be separated to be carried thereunder and operative to return said materials over the top thereof and back on to said separating surface, said separating surface having a relatively flat inclination during its approach to the separating board and a relatively steep inclination after passing from thereunder.

7. In a grain separator, the combination with an apron having an upwardly moving transversely inclined separating surface, a coöperating floating separating board extending transversely over and resting on said separating surface, said separating board being arranged to permit the materials to be separated to be carried thereunder and operative to return said materials over the top thereof and back on to said separating surface, and a deck over which said separating surface passes in its approach to the separating board.

8. In a grain separator, the combination with an apron having an upwardly moving transversely inclined separating surface, a coöperating floating separating board extending transversely over and resting on said separating surface, said separating board being arranged to permit the materials to be separated to be carried thereunder and operative to return said materials over the top thereof and back on to said separating surface, a deck over which said separating surface passes in its approach to the separating board, and means for vertically adjusting the deck.

9. In a grain separator, the combination with an apron having an upwardly moving transversely inclined separating surface, a coöperating floating separating board extending transversely over and resting on said separating surface, a pair of arms secured to the separating board, means for supporting the free ends of said arms, and a deck carried by the arms and over which deck said separating surface moves during its approach to the separating board.

10. In a grain separator, the combination with an apron having an upwardly moving transversely inclined separating surface, a coöperating floating separating board extending transversely over and resting on said separating surface, a pair of arms secured to the separating board, means for supporting and vertically adjusting the free ends of said arms, and a deck carried by the arms and over which deck said separating surface moves during its approach to the separating board.

11. In a grain separator, the combination with an apron having an upwardly moving transversely inclined separating surface, and a coöperating floating separating board, extending transversely over and resting on said separating surface, the under surface of said separating board being segmental in cross section.

12. In a grain separator, the combination with an apron having an upwardly moving transversely inclined separating surface, and a coöperating floating separating board, extending transversely over and resting on said separating surface, the under surface of said separating board being segmental in cross section, and the top of said separating board being extended beyond the body portion thereof in an opposite direction to the approaching movement of said separating surface.

In testimony whereof I affix my signature in presence of two witnesses.

HENRY H. MEYER.

Witnesses:
WILLIAM H. KOCH,
HARRY D. KILGORE.